United States Patent
Maor et al.

(10) Patent No.: US 9,158,902 B2
(45) Date of Patent: Oct. 13, 2015

(54) SOFTWARE MODIFICATION FOR PARTIAL SECURE MEMORY PROCESSING

(75) Inventors: Moshe Maor, Kiryat Mozkin (IL); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 13/994,411

(22) PCT Filed: Dec. 29, 2011

(86) PCT No.: PCT/US2011/067781
§ 371 (c)(1),
(2), (4) Date: Jun. 14, 2013

(87) PCT Pub. No.: WO2013/101034
PCT Pub. Date: Jul. 4, 2013

(65) Prior Publication Data
US 2014/0208435 A1    Jul. 24, 2014

(51) Int. Cl.
*G06F 7/04* (2006.01)
*G06F 21/12* (2013.01)
*G06F 21/00* (2013.01)

(52) U.S. Cl.
CPC ............... *G06F 21/12* (2013.01); *G06F 21/00* (2013.01)

(58) Field of Classification Search
CPC ..... G06F 21/60; G06F 21/10; G06F 21/6245; G06F 21/6218; G06F 21/6254
See application file for complete search history.

(56) References Cited

U.S. PATENT DOCUMENTS

| | | | |
|---|---|---|---|
| 4,817,140 A | 3/1989 | Chandra et al. | |
| 6,658,548 B1 * | 12/2003 | Kochar et al. | 711/202 |
| 7,051,211 B1 * | 5/2006 | Matyas et al. | 713/187 |
| 7,730,311 B2 | 6/2010 | Everett et al. | |
| 7,730,542 B2 * | 6/2010 | Cronce et al. | 726/26 |
| 8,352,837 B1 * | 1/2013 | Zhu et al. | 714/776 |
| 2005/0028148 A1 * | 2/2005 | Civlin | 717/145 |
| 2006/0095793 A1 | 5/2006 | Hall | |
| 2007/0113079 A1 * | 5/2007 | Ito et al. | 713/166 |
| 2008/0059812 A1 * | 3/2008 | Everett et al. | 713/194 |
| 2010/0269106 A1 * | 10/2010 | Arnold | 717/168 |
| 2013/0091543 A1 * | 4/2013 | Wade et al. | 726/1 |

OTHER PUBLICATIONS

PCT International Search Report for PCT Counterpart Application No. PCT/US2011/067781, 4 pgs., (Sep. 24, 2012).

(Continued)

*Primary Examiner* — Fikremariam A Yalew
(74) *Attorney, Agent, or Firm* — Nicholson De Vos Webster & Elliott LLP (57) ABSTRACT

This disclosure is directed to software modification that may be used to prevent software piracy and prevent unauthorized modification of applications. In some embodiments, a software vendor may modify software prior to distribution to a user. The software vendor may extract cutouts from an application to create a modified application. The modified application and the cutouts may be downloaded by a user device. The user device may run the application using the modified application and by executing the cutouts in a secure execution environment that conceals the underlying code in the cutouts.

17 Claims, 9 Drawing Sheets (56) References Cited

OTHER PUBLICATIONS

PCT Written Opinion of the International Searching Authority for PCT Counterpart Application No. PCT/US2011/067781, 6 pgs., (Sep. 24, 2012).

PCT Notification concerning Transmittal of International Preliminary Report on Patentability (Chapter I of the Patent Cooperation Treaty) for PCT Counterpart Application No. PCT/US2011/067781, 8 pgs., (Jul. 10, 2014).

* cited by examiner

SOFTWARE MODIFICATION FOR PARTIAL SECURE MEMORY PROCESSING

CROSS-REFERENCE TO RELATED APPLICATIONS

This patent application is a U.S. National Phase Application under 35 U.S.C. §371 of International Application No. PCT/US2011/067781, filed Dec. 29, 2011, entitled SOFTWARE MODIFICATIN FOR PARTIAL SECURE MEMORY PROCESSING.

TECHNICAL FIELD

This disclosure relates generally to the field of computers. In particular, this disclosure relates to modification of computer software to repackage code for execution in-part from secure memory on a user device.

BACKGROUND ART

Application stores are rapidly becoming an important distributor of applications for many platforms such as smartphones, tablets, and conventional computers (e.g., notebook computers, desktop computers, etc.). Application stores are often web-based stores that enable a user to download software electronically without receiving a physical product. There are several reasons for the success of this distribution mechanism for applications. One reason is that developers can use application stores to enable broad distribution of their applications without a large investment by the developer.

The application store is rapidly establishing itself as the main software distribution channel. Currently, hundreds of thousands of smartphone applications are available for download for popular smartphone and tablet operating systems (OS). In addition, thousands of conventional computer applications for conventional computers that run Windows® operating system (OS) or Apple OS are also available. Application stores are expected to increase in popularity in the future and become a dominant distributor of software.

While the current application store growth to date is impressive, application stores are dealing with many challenges that either threaten to inhibit their future growth or endanger it completely. In general the challenges for these application stores include: 1) software piracy, 2) counterfeit applications that create operational, legal, and security issues for application store operators, 3) inability to attract big name independent software vendors (ISVs), and 4) difficulty in offering "try before you buy" or other shareware versions of the applications through this distribution mechanism.

Software piracy has been problematic for software developers and vendors since mainstream computing has become widely available to users. Particularly, with the ease of access to the Internet and ease of copying and sending data over the Internet, software piracy continues to run rampant despite heavy penalties imposed to those prosecuted for pirating software.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to software modification that may be used to prevent software piracy and prevent unauthorized modification of applications. In some embodiments, a software vendor may modify the software prior to distribution to a user. The modified software may be sold, leased, or "tried" by users that download the software.

The software vendor, which may host of an application store, may initially receive an application from a developer or software company. The software vendor may then remove portions of the software, such as sections of code, functions, or other portions of the software, referred to herein as "cutouts." The software vendor may encrypt the cutouts and store them as separate parts from a modified version of the application that does not include the cutouts (but includes holes where code has been cutout), referred to herein as the "modified application." The software vendor may then transmit at least the modified application and the encrypted cutouts to a user device, and possibly other data such as a license, a user manual, and so forth.

In accordance with some embodiments, the user device may store and decrypt the cutouts in a secure memory location referred to herein as "secure memory." The secure memory may be memory that is not accessible by external software, such as an operating system or other native software running on the user device. The secure memory may include a secure execution environment that enables secure execution of contents in the secure memory by one or more processors or processor cores. The secure memory may be limited to access by the secure execution environment. Thus, the code contained in the cutouts is not revealed or exposed to the user of the user device, software running on the user device, or to others (e.g., hackers, vendors, etc.). The secure memory may store the cutouts in a working state (i.e. unencrypted). This secure memory and secure execution environment cooperates with the modified application in harmony to execute the original application.

The modified application may be loaded and executed by the operation system on the user device as currently performed for unmodified applications. When a requested part of the modified application includes one of the cutouts, redirect code may direct processing to the secure execution environment to execute a corresponding cutout and then return resultant data to the modified application, which may resume running using the resultant data but without actual processing of the code in the cutout.

In some embodiments, the user device may include a single "framework" secure execution environment that is used for different applications that include cutouts. The secure execution environment may load a cutout of an application, along with any appropriate meta-data (e.g., inputs, variables, etc.).

For example, one application may have two cutouts. A loader stack may load the encrypted code of at least one of these cutouts into the secure execution environment, including and any meta-data associated with the cutout(s). Inside the into the secure execution environment, the cutout is decrypted and can be called by the modified application to perform operations (e.g., function, calculations, etc.) of these portions of the application that were removed from the application and stored in the secure memory for processing by the secure execution environment.

In various embodiments, each application may use a different copy of the framework of the secure memory and the secure execution environment because the secure execution environment may be mapped on an address space of their respective applications.

The techniques, apparatuses, and systems described herein may be implemented in a number of ways. Example implementations are provided below with reference to the following figures.

Illustrative Environment

Figure 1:
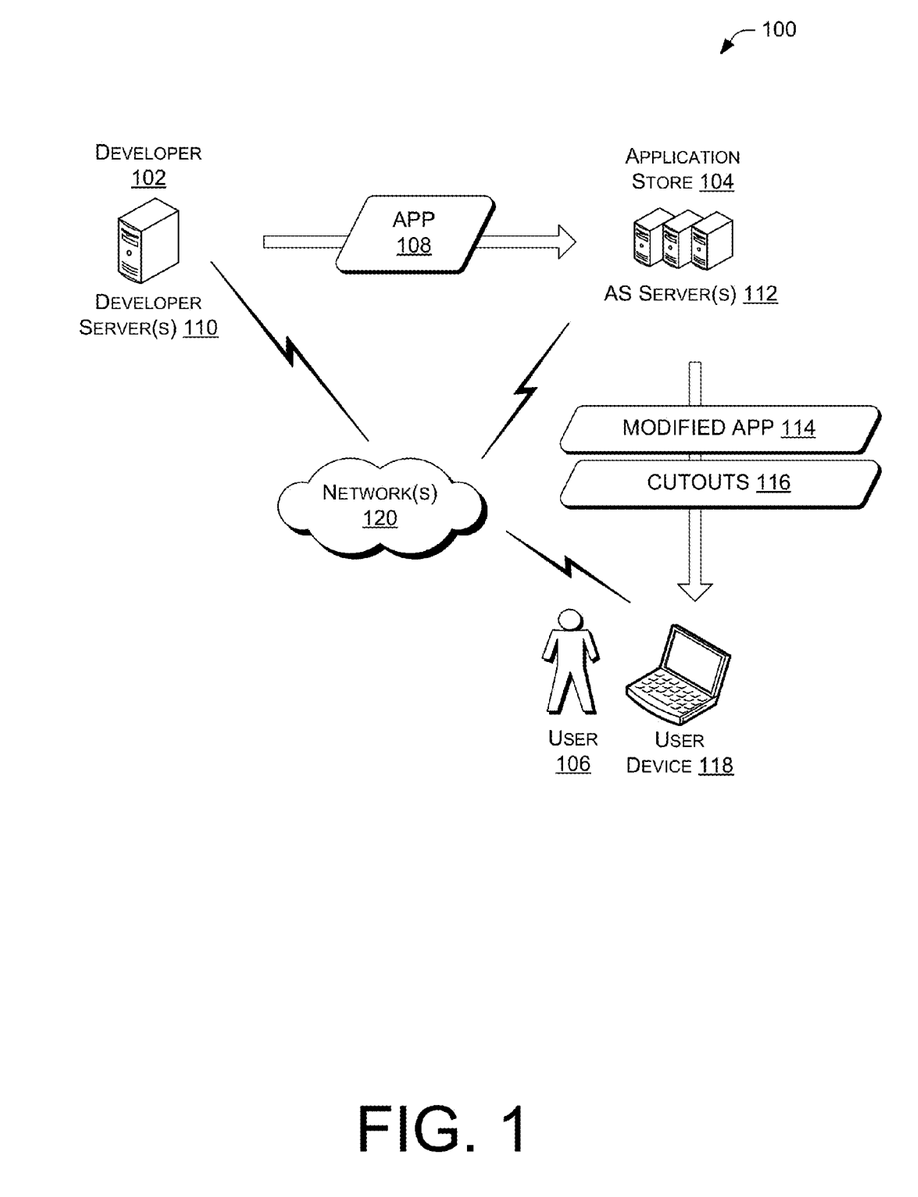
FIG. 1 is a schematic diagram of an illustrative computing environment to securely provide modified software from an application store to a user device for execution of the software.

FIG. 1 is a schematic diagram of an illustrative computing environment 100 to securely provide modified software from an application store to a user device. The environment includes a developer 102 (such as an independent software vendor (ISV)), an application store 104, and a user 106. In some instances, the developer 102 and the application store 104 may be the same entity. The developer may create or develop an application 108, which may be stored and/or made accessible by a developer server 110. The application store (AS) 104 may receive the application using AS servers 112. The AS servers 112 may modify the application 108 to create cutouts, as discussed above, and to store encrypted cutouts 114 and a modified application 116 that does not include the cutouts. The AS servers 112 may enable the user 106 to download the software, via the encrypted cutouts 114 and modified application 116, to a user device 118. The user device 118 may store the encrypted cutouts 114 in secure memory and execute the cutouts, after decryption, in a secure execution environment. The developer server 110, AS servers 112, and the user device 118 may exchange data over one or more networks 120.

Figure 2:
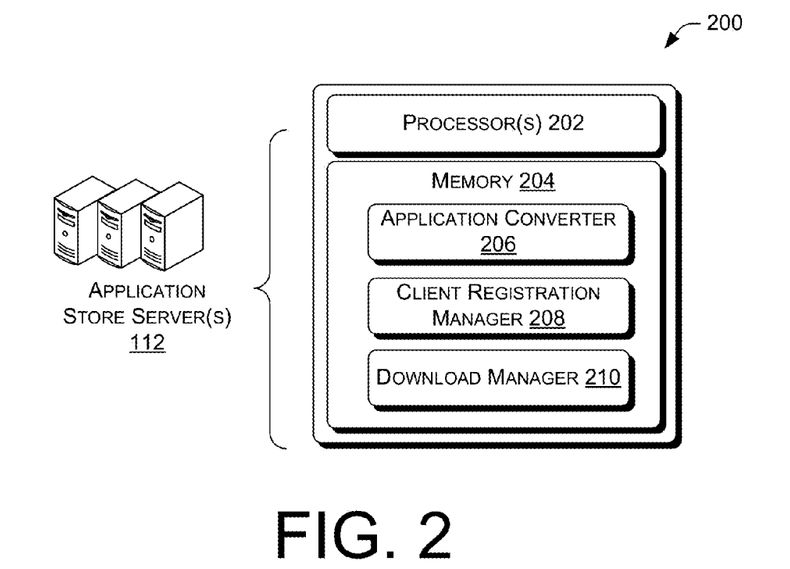
FIG. 2 is a block diagram of an illustrative application store server.

The user device 118 may include a personal computer, a tablet computer, a mobile telephone (including a smartphone), a personal digital assistant (PDA), a television, a set top box, a gaming console, or another electronic, portable or handheld device. The network(s) 120 may include wired and/or wireless networks that enable communications between the various computing devices described in the environment 100. In some embodiments, the network(s) 120 may include local area networks (LANs), wide area networks (WAN), mobile telephone networks (MTNs), and other types of networks, possibly used in conjunction with one another, to facilitate communication between the various computing devices (i.e., the developer server(s) 110, the AS servers 112, and/or the user device 118). The AS servers 112 and the user device 118 are described in greater detail with reference to FIGS. 2 and 3, respectively. FIG. 2 shows illustrative computing architecture 200 of the AS servers 112.

The architecture may include processors(s) 202 and memory 204. The memory 204 may store various modules, applications, programs, or other data. The memory 204 may include instructions that, when executed by the processor(s) 202, cause the processors to perform the operations described herein for the AS servers 112. In some embodiments, the memory 204 may store an application converter 206, a client registration manager 208, and a download manager 210. Each module is discussed in turn.

The application converter 206 may be a software engine that takes the application that was uploaded by the developer as input, and extracts pieces of it the application as cutouts. The cutouts may be selected as important portions of code that, when extracted from the application, make the application inoperable. Further, the cutout portions, when extracted, prevent another person from reconstructing the complete application, thereby frustrating piracy attempts. After upload of the application, the application converter may perform analysis of the application binary and automatically identify those pieces that would be most relevant for the proper execution of the application. In some instances, the developer may indicate the pieces to be used as the cutouts. The application converter 206 may then replace the extracted pieces with redirect code, which are calls to external locations and may be based on a table. The cutouts may be aggregated with some metadata (such as return values, parameters, etc.) in a separate file. This file may be encrypted.

The client registration manager 208 may provision a unique client key for each new client that is running the client registration flow. This process may be bounded to secure memory and to a secure execution environment technology used by the user device 118. In some embodiments, the client registration manager 208 is provided by a same entity that delivers a protected software distribution technology client software stack, as discussed below with reference to FIG. 3.

The download manager 210 may create a license and encrypt the cutout of the application. For example, the download manager 2110 may encrypt the cutout if the binary is to be different on a per-platform basis rather than a single encryption key per application for all clients. The download manager 210 may encrypt the license with a specific client key (that was provisioned by the client registration manager 208 during enrolment time) and may transmit the specific client key with the application and the encrypted cutout.

Figure 3:
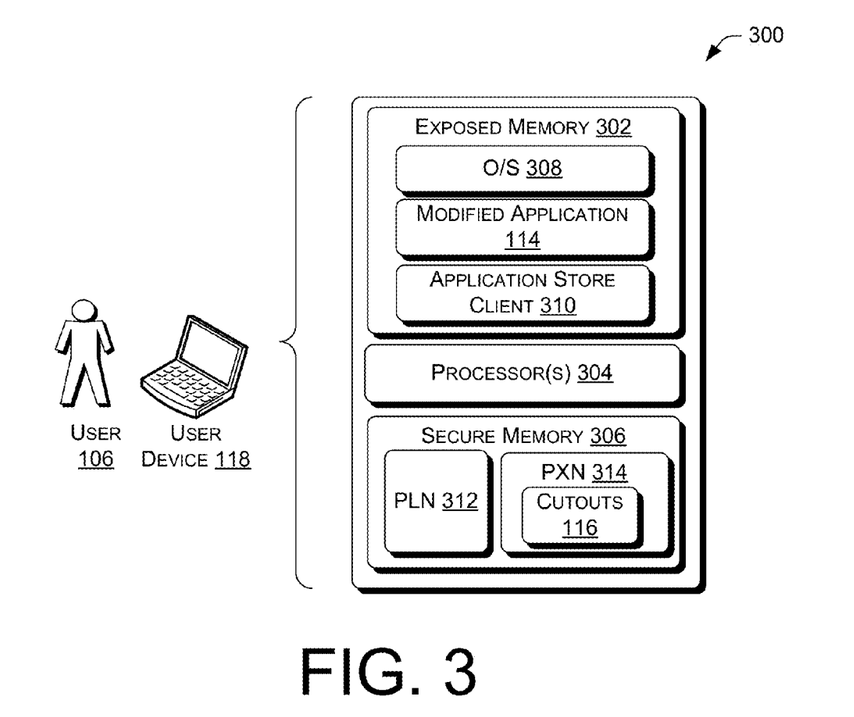
FIG. 3 is a block diagram of an illustrative user device.

FIG. 3 shows illustrative computing architecture 300 of the user device 118. The architecture may include exposed memory 302, processors(s) 304, and secure memory 306. The exposed memory 302 may store various modules, applications, programs, or other data. The exposed memory 302 may include instructions that, when executed by the processor(s) 304, cause the processors to perform some of the operations described herein for the user device 118. The exposed memory may be conventional memory, such as flash memory, RAM, or other types of conventional memory. In some embodiments, the exposed memory 304 may store an operating system (OS) 308, the modified application (modified app) 114, and an application store client 310, as well as other native applications or programs.

The application store client 310 may support secure downloads from the application store 204. The application store client 310 may utilize the secure memory 306 of the client device 118 to store the encrypted cutouts 116. The application store client 310 may also activate the secure memory and the secure execution environment on the user device 118.

In accordance with various embodiments, the secure memory 306 may store a protected software distribution licensing secure environment (PLN) 312, which may be used for a one time enrollment into the application store 104 and later on may be used each time the user 106 wants to launch a secured application (having the cutouts). The PLN 312 may manage keying materials of the protected software distribution technology and may parse licenses. The PLN 312 may be stored in the secured memory 306 and may act as a singleton on the client platform (the user device 118) for any given online application store that the platform works with. In some instances, the PLN 312 may concurrently support multiple application stores. The PLN 312 may participate in the user enrollment and the application execution, as discussed below.

In some embodiments, the secure memory 306 may store a protected software distribution execution environment (PXN) 314 (which may be the secure execution environment) as a secure execution environment that stores decrypted contents of the application (cutout). A PXN 314 may be created for each secure application that executes on the user device 118. Cutouts from different applications may vary in size. In some embodiments, the PXN 312 is loaded at a minimum size to enable execution and properly accommodate the cutout from the modified application. This may be accomplished as described below.

A static PXN binary that is part of a software stack may be built to a full maximum supported size. The PXN binary can be loaded partially to fit any smaller demand of a particular application. For example, the maximum size per application may be 2 MB of cutout (which makes a slightly bigger maximum size PXN); however, for a given application that uses only 0.5 MB of cutout, the software stack may load the PXN 314 with that size. A measurement table that is part of the stack may provide a set of possible sizes with their respective measurements. When the stack loads the PXN 314 for a particular application, it may be using the embedded protected software distribution metadata that is part of the application, to decide the size. A loading stack can build the PXN 314 with a correct size. An implementation consideration for the PXN 314 is to design the PXN with minimum overhead size, due to the fact that this architecture may pay for this overhead for every running application.

Illustrative Operation

FIGS. 4-9 show illustrative processes to modify software and to securely provide the modified software to a user device for secure execution by the user device. The processes are illustrated as a collection of blocks in a logical flow graph or schematic diagram, which represent a sequence of operations that can be implemented in hardware, software, or a combination thereof. In some instances, the collection of blocks is organized with respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes are described with reference to FIGS. 1-3. Of course, the processes may be performed in other similar and/or different environments.

Figure 4:
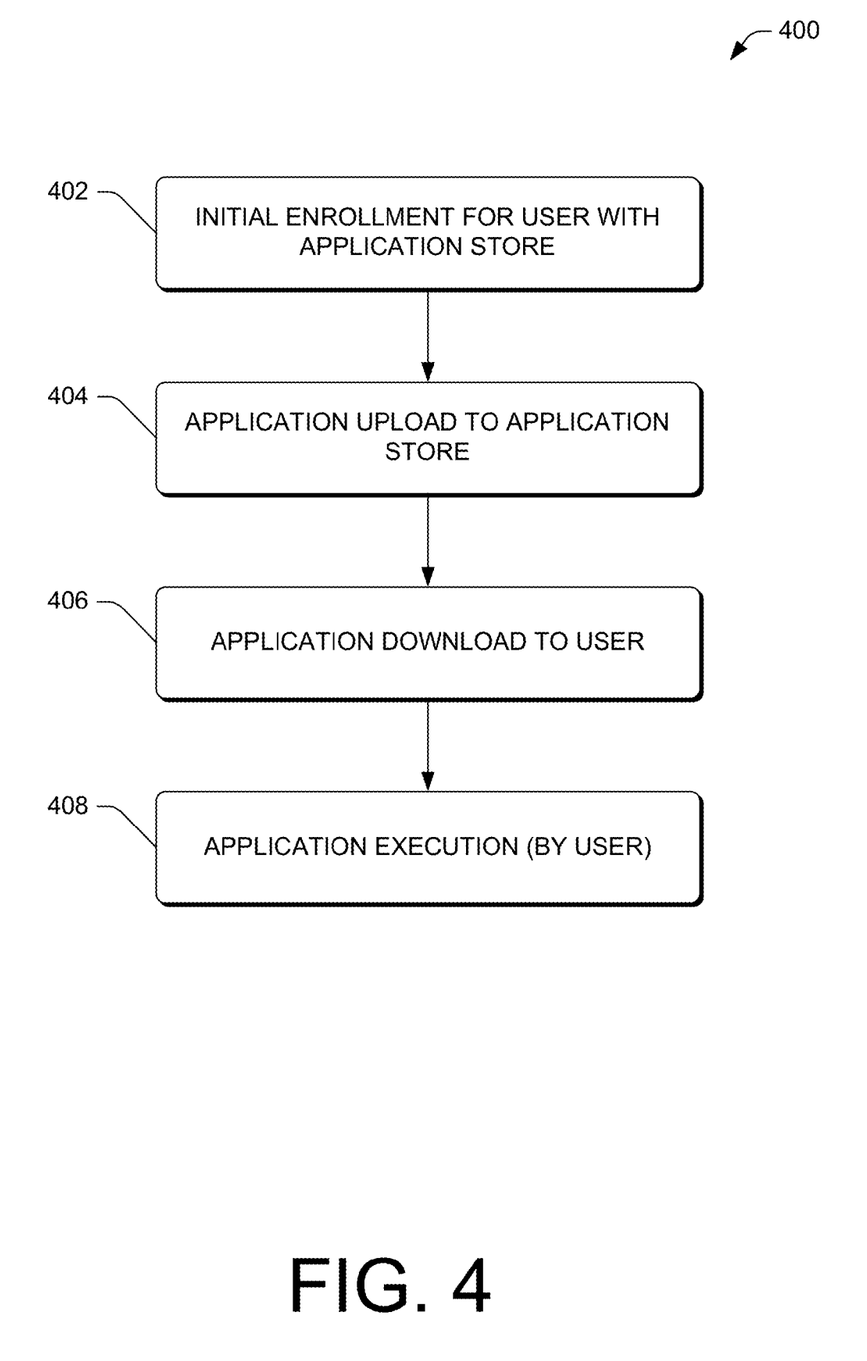
FIG. 4 is a flow diagram of an illustrative process to modify software and to securely provide the modified software to a user device for execution of the software.

FIG. 4 is a flow diagram of an illustrative process 400 to modify software and to securely provide the modified software to a user device for secure execution by the user device.

At 402, the AS servers 112 may initially enroll the user 106 and user device 118 with the application store 104. The enrollment may include an exchange of an encryption key. In accordance with various embodiments, the enrollment may enable establishment or use of the PLN 312 on the user device 118. The operation 402 is described in greater detail with respect to FIG. 5.

At 404, the developer server(s) 102 may upload an application to the AS servers 112. The AS servers 112 may remove the cutouts 116 from the application to create the modified application 114. The AS servers 112 may also encrypt the cutouts at the operation 404. The operation 404 is described in greater detail with respect to FIG. 6.

At 406, the AS servers 112 may download the modified application 114 and the encrypted cutouts 116 to the user device 118. The AS servers 112 may also provide a license for the user 118 at the operation 406. The operation 406 is described in greater detail with respect to FIG. 7.

At 408, the user device 118 may execute the modified application. The user device 118 may, when applicable, execute one or more of the cutouts in the PXN 314 to conceal the code in the cutouts and to pass resultant data back to the modified application running on the user device 118. Thus, the application may operate as designed by the developer even after the modification and the creation of the cutouts by the AS servers 112. The code used in the cutouts may be pretested and concealed from users, the operating system, native software, hackers, and others though use of the secure memory 306 and the PXN 314. The operation 408 is described in greater detail with respect to FIG. 8.

Figure 5:
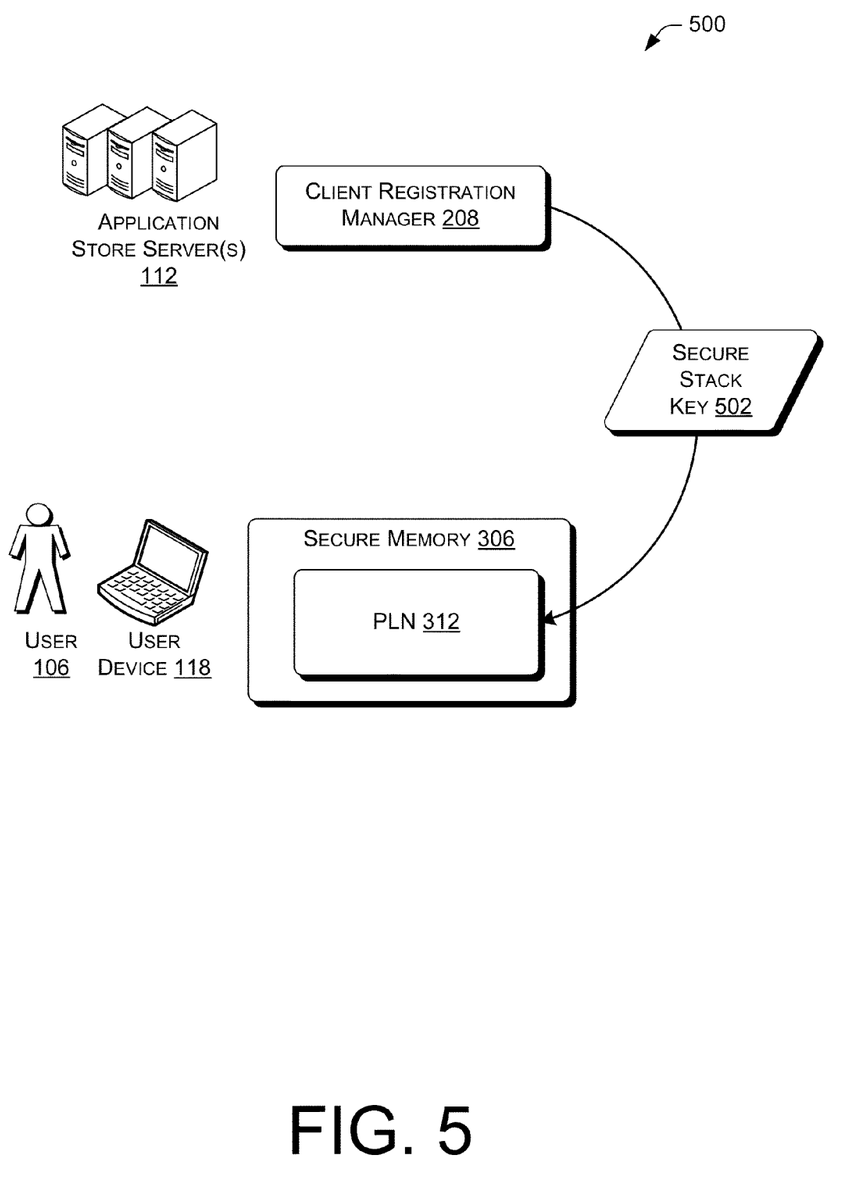
FIG. 5 is a schematic diagram showing transmission of a secure stack key from an application store server to a user device.

FIG. 5 is a schematic diagram depicting an environment 500 that shows transmission of a secure stack key from the AS servers 112 to the user device 118. In accordance with various embodiments, the user 106 may request to enroll in a relationship with the application store 104, such as by establishing an account. The user 106 may provide user information, payment information, contact information, information about the user device 118, and/or other data to the application store 104. In return, the AS servers 112 may provide a secure stack key 502 to the PLN 312 stored in the secure memory 306 of the user device 118. The secure stack key 502 may be used to decrypt the cutouts 116, the modified application 114, the license for an application, or a combination thereof. Other encryptions may also be used when transmitting data from the AS servers 112 to the user device 118. The user device 118 may use the secure stack key 502 (or simply "key" or "encryption key") when decrypting as least some information or data from the AS servers 112.

Figure 6:
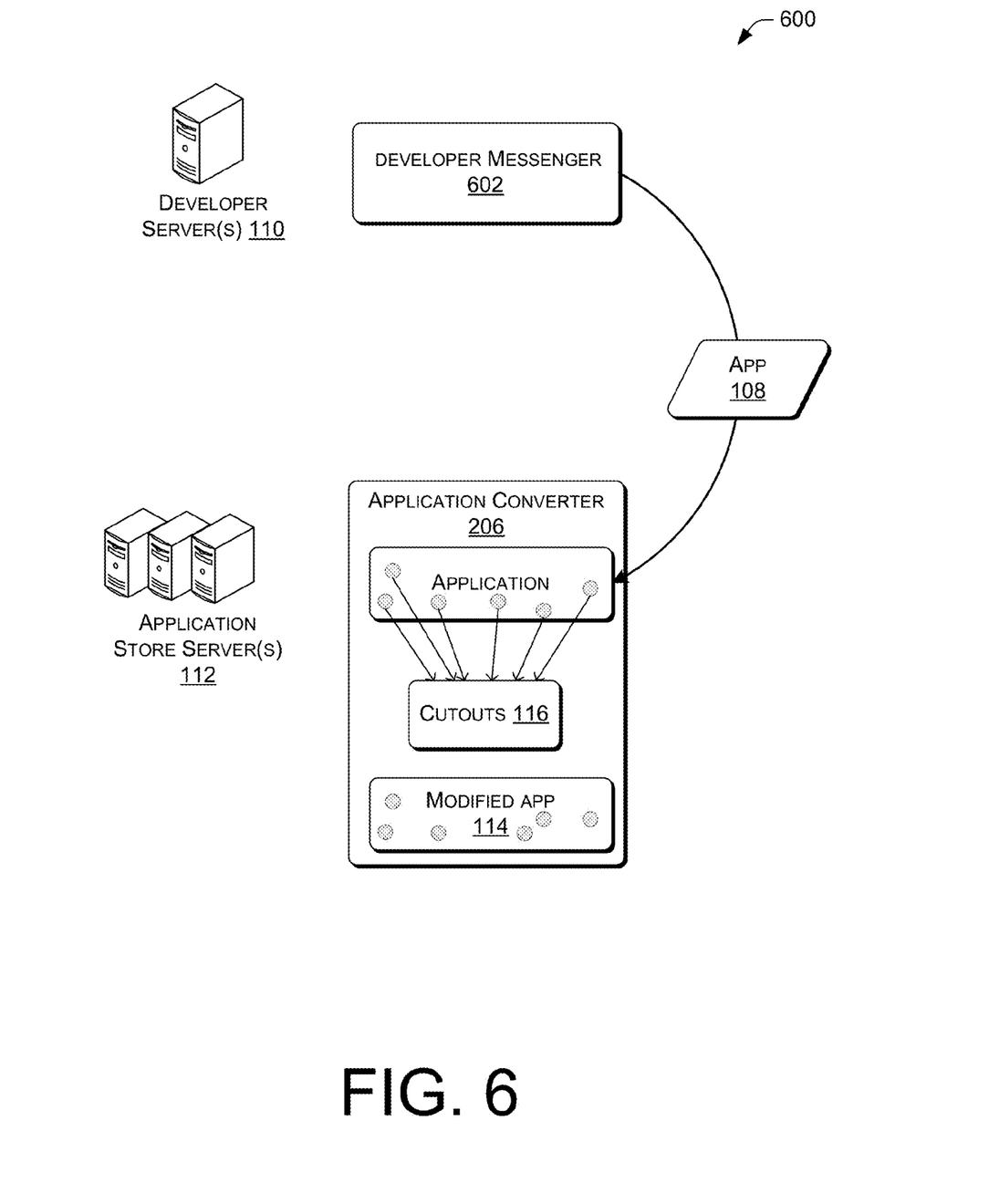
FIG. 6 is a schematic diagram showing transmission of an application to the application store server, which then modifies the application to create cutouts.

FIG. 6 is a schematic diagram depicting an environment 600 that shows transmission of an application to the application store server 104, which then modifies the application to create cutouts. A developer messenger 602 may transmit the application 108, which is unmodified and includes a complete set of the code, to the AS servers 112. Thus, from the developer perspective, there is no change in the application development itself. The building process at the developer site is the same as a process for any other application.

For secured applications (for example, when the application is not free), after uploading into the application store 104, the application converter 206 may analyze the application (e.g., application binary) and generate the list of cutouts. The cutouts may be identified by designation from the developer, from detection of discrete portions of code by the AS servers 112, or a combination of both. An output of the application converter 206 is a modified application 114 (e.g., application binary) that includes proper calls (redirect code) to the secure execution environment (i.e., the PXN 314) of the user device 118. The output also includes the cutouts that have been encrypted by the AS servers 112. The output may also include metadata to properly load and execute application as the modified application with the cutouts. The metadata may further include a size for the cutouts and other possible parameters.

In some embodiments, the application converter 206 may perform an algorithm similar to an illustrative algorithm that follows. Given an application A that is comprised of code sequence C=(c0, c1, c2 . . . $c_{cn}$) and data area (d0, d1, d2 . . . , $d_{dn}$), a process may extract n pieces of sequential code E=(e1, . . . , en) where ei=($c_{i1}$, . . . , $c_{i2}$) in such a way that: (1) when executing A along with the extracted E pieces (denoted AE) the operation is not different from A. (2) E pieces are sequential linear code excerpts (i.e., no jumps from within ei into ej, i<>j and no jumps between ei and A). (3) E pieces do not include a subset of software interrupts. The cutouts may be selected in such a way that careful examination of the application execution flow of A and E, during interleaved running (where E execution is opaque, but can be single stepped, etc.) an observer has no efficient way to reverse engineer the E pieces. Optionally, E pieces also include a subset of D, especially trivial when only Ei operates on some subset of D, that subset can be inside Ei. In some embodiments, the cutouts 116 may be complete functions from the application. The cutouts 116 may also be leaf functions that are not calling an outside function or system call, thereby protecting local data of the extracted functions from being revealed. In some embodiments, the cutouts 116 are limited in size to a threshold size of memory (bytes).

Figure 7:
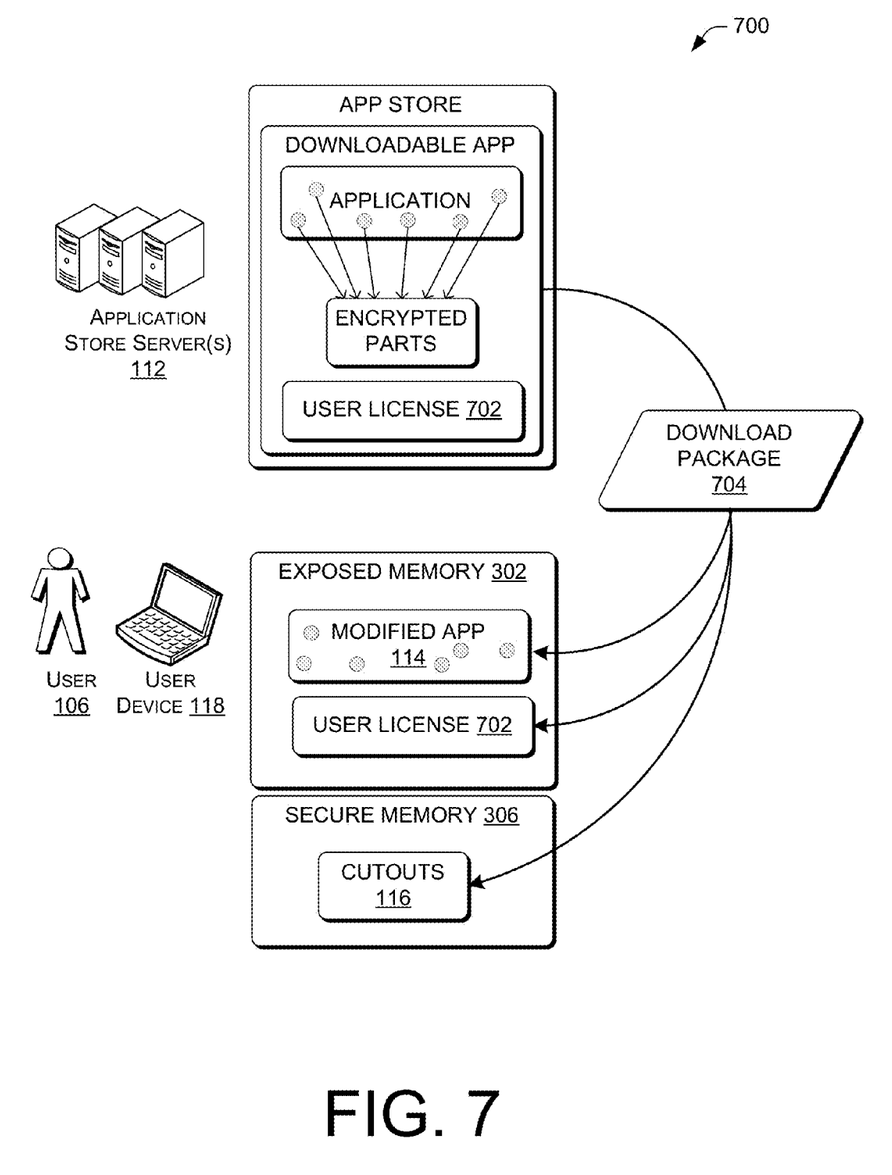
FIG. 7 is a schematic diagram showing transmission of the modified application and cutouts to the user device.

FIG. 7 is a schematic diagram depicting an environment 700 that shows transmission of the modified application 114 to the user device 118. In some embodiments, the AS servers 112 may generate a unique key for the application for the particular user 106 and encrypt the cutout block with that key. The AS servers 112 may also generate a unique user license 702 for the user. The user license 702 may include optional policies for the activation of the application by the user and the unique application key. In some embodiments, the license may only allow limited use of the application (e.g., trial basis based on time or number of uses, etc.) or for leasing of the application (e.g., software as a service). The AS servers 112 may encrypt the license with the unique client key (that was provisioned during enrollment). The AS servers 112 may create a download package 704 that includes the modified application 114, the encrypted cutout 116 and the user license 702, which may then be transmitted to the user device 118.

Figure 8:
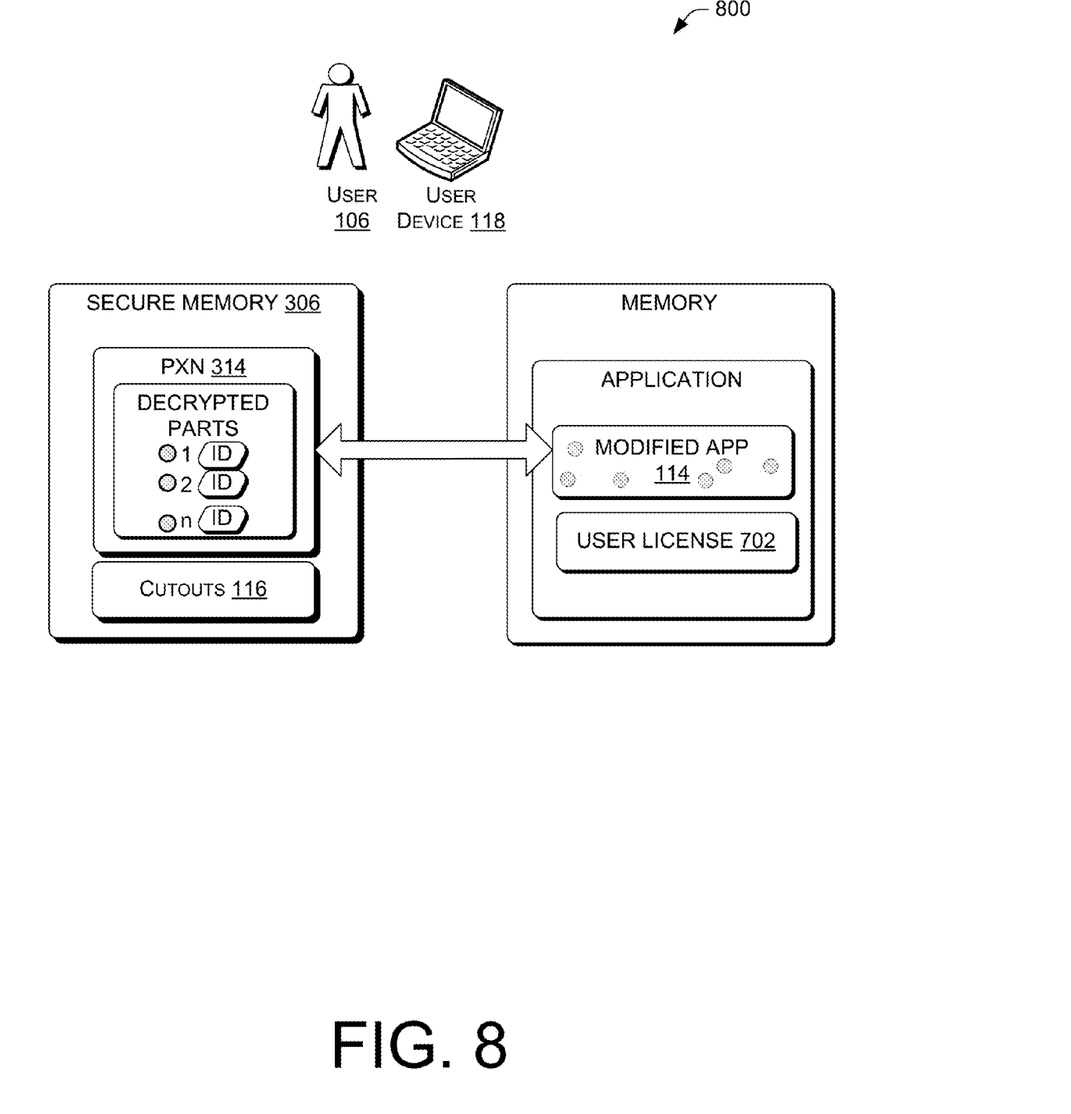
FIG. 8 is a schematic diagram showing execution of the modified application by the user device.

FIG. 8 is a schematic diagram depicting an environment 800 that shows execution of the modified application 114 by the user device 118. In accordance with various embodiments, the user device 118 may load the modified application 114 for execution. The PXN 314 may then be loaded having a size suitable for the cutouts 116. The license 702 may be sent to the PLN 312 for decryption to the PXN 314, which may occur after a verification or notification that the application runs under terms and policies of the license. The cutouts 116 may be streamed into the PXN 314. The application may be activated using the modified application 114 and the cutouts 116. In addition, the stack may clean the EPC when application is terminated, among other functions.

In some embodiments, the PXN 314 may operate as a buffer and may load additional code for the cutouts that could not be stored in the PXN 314 due to size constraints. Thus, the PXN 314 may retrieve, and possibly decrypt, some additional code and/or cutouts (or portions thereof) during processing of a cutout.

Figure 9:
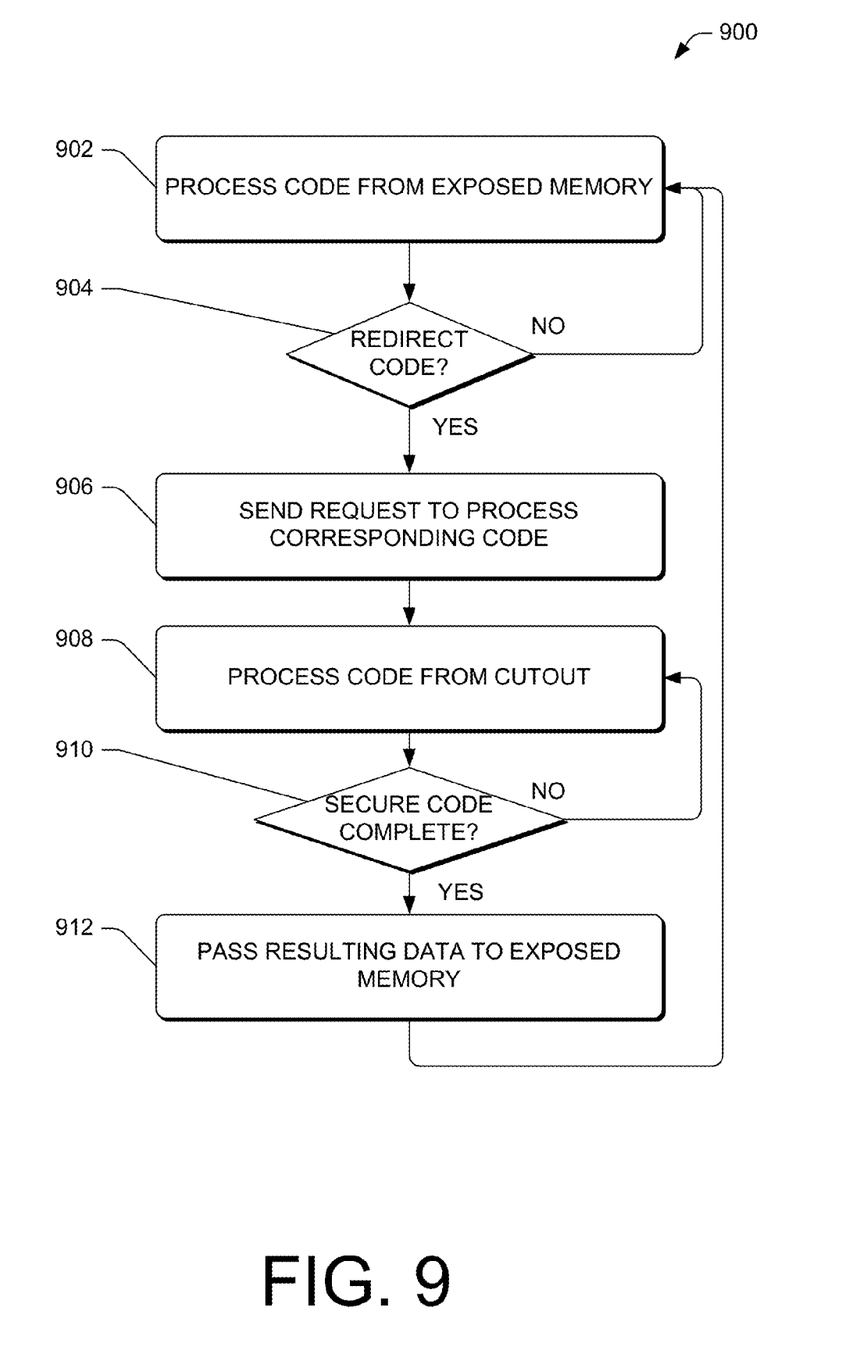
FIG. 9 is a flow diagram of an illustrative process to execute the modified application by the user device.

FIG. 9 is a flow diagram of an illustrative process 900 to execute the modified application by the user device 118.

At 902, the user device 118 may process code from the modified application 114 that is stored in the exposed memory 302.

At 904, the user device 118 may determine whether a redirect code is reached in the code from the modified application 114. The redirect code (or redirection code, jump code, etc.) may be code that links to a corresponding cutout stored in the PXN 314. When no redirect code is found (following the "no" route), then the processing continues the operation 902. However, when the redirect code is found (following the "yes" route from the decision operation 904), then processing may continue at 906.

At 906, the user device 118 may send a request to the PXN 314 to process the corresponding cutout. The request may include metadata, parameters, and/or other data. For example, the request may include variables that are used by the code in the cutouts.

At 908, the user device 118 may process the code in the cutout in the PXN 314. The processing of the cutout may be concealed from the operating system, other applications, other users, the user 106, and so forth.

At 910, the user device 119 may determine whether the code has been processed. When the code is not complete (still processing), then the process may continue at 908 following the "no" route from the decision operation 910. When the code from the cutout is complete (following the "yes" route from the decision operation 910), then the process may continue at an operation 912.

At 912, the PXN 314 may pass parameters back to the exposed memory 302 to enable the modified application 114 to continue to run. For example, the output of the code may be passed back to the exposed memory 302 without revealing the underlying code and by obscuring the underlying logic, to an extent possibly, of the code in the cutout. The decrypted cutout may not be readable by any software or hardware on the user device, other than the processor thread or processor core thread that is executing the cutout. In various embodiments, the operation 912 may not include the PXN 314 passing back information to the main application because the PXN may simply change a state of the exposed memory 302 and/or return data through registers.

In some embodiments, the user device 118 may announce or otherwise make available information that indicates a legitimacy or valid license for the modified application and a state of the application as modified. Thus, the user device 118 may indicate that the application includes the cutouts as described here.

Figure 10:
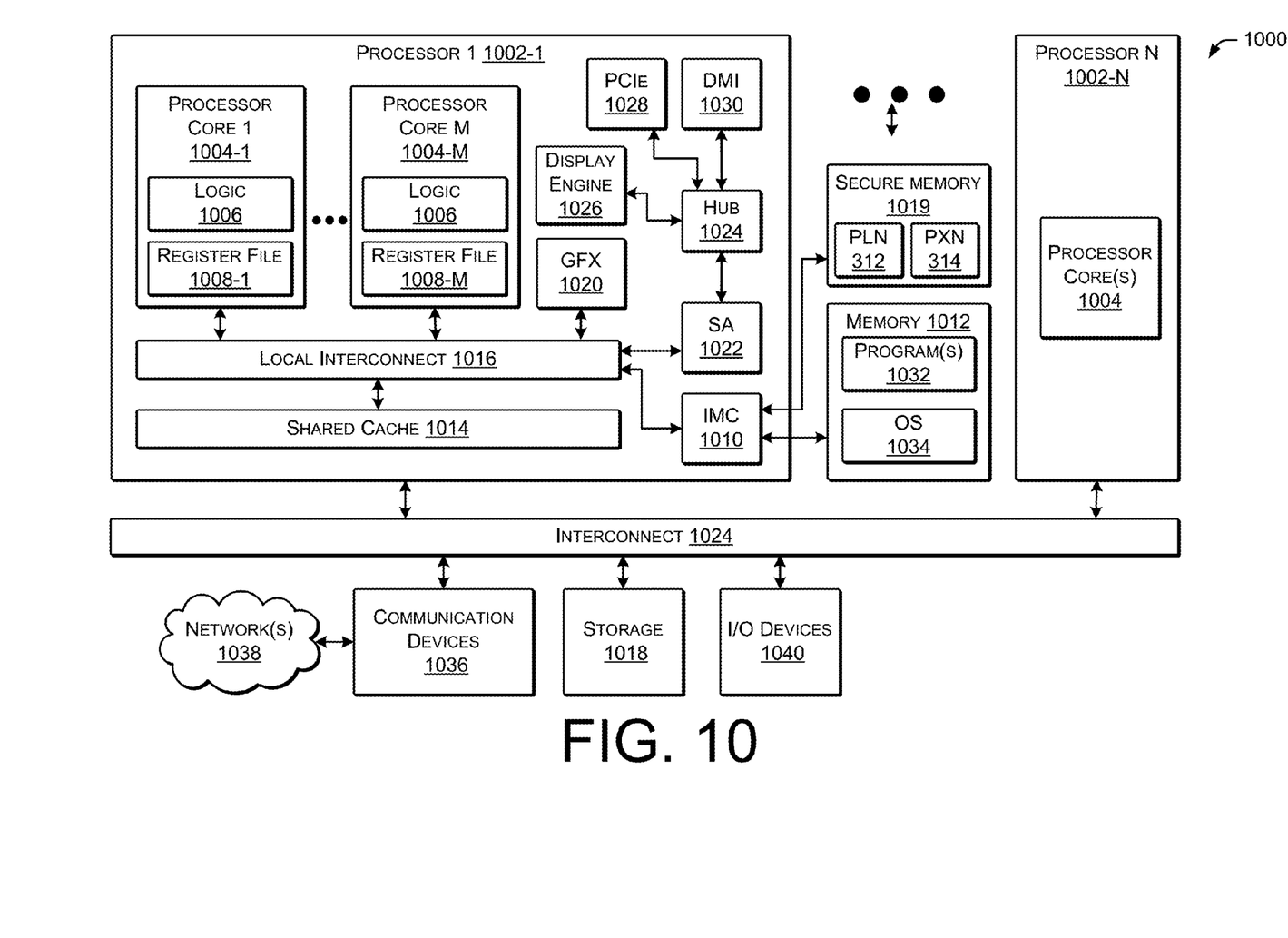
FIG. 10 is a block diagram of another illustrative user device.

FIG. 10 is a block diagram of another illustrative user device 1000 that may perform the processes and functionality described herein. The user device 1000 may include one or more processors 1002-1, . . . , 1002-N (where N is a positive integer≥1), each of which may include one or more processor cores 1004-1, . . . , 1004-M (where M is a positive integer≥1). In some implementations, as discussed above, the processor(s) 1002 may be a single core processor, while in other implementations, the processor(s) 1002 may have a large number of processor cores, each of which may include some or all of the components illustrated in FIG. 10. For example, each processor core 1004-1, . . . , 1004-M may include an instance of logic 1006 for interacting with a register file 1008-1, . . . , 1008-M and/or performing at least some of the operations discussed herein. The logic 1006 may include one or more of dedicated circuits, logic units, microcode, or the like.

The processor(s) 1002 and processor core(s) 1004 can be operated, via an integrated memory controller (IMC) 1010 in connection with a local interconnect 1016, to read and write to a memory 1012. The processor(s) 1002 and processor core(s) 1004 can also execute computer-readable instructions stored in a memory 1012 or other computer-readable media. The memory 1012 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 1004, in some implementations, the multiple processor cores 1004 may share a shared cache 1014, which may be accessible via the local interconnect 1016. Additionally, storage 1018 may be provided for storing data, code, programs, logs, and the like. The storage 1018 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the user device 1000, the memory 1012 and/or the storage 1018 may be a type of computer readable storage media and may be a non-transitory media.

In accordance with various embodiments, the processor 1102 may be in communication with secure memory 1019 via the IMC 1010. The secure memory 1019 may include the PLN 312 and/or the PXN 314. The secure memory 1019 may be stored, at least partially, with the processors 1002-1 or another processor or processor core.

In various embodiments, the local interconnect 1016 may also communicate with a graphical controller (GFX) 1020 to provide graphics processing. In some embodiments, the local interconnect 1016 may communicate with a system agent 1022. The system agent 1022 may be in communication with a hub 1024, which connects a display engine 1026, a PCIe 1028, and a DMI 1030.

The memory 1012 may store functional components that are executable by the processor(s) 1002. In some implementations, these functional components comprise instructions or programs 1032 that are executable by the processor(s) 1002. The example functional components illustrated in FIG. 10 further include an operating system (OS) 1034 to mange operation of the user device 1000.

The user device 1000 may include one or more communication devices 1036 that may include one or more interfaces and hardware components for enabling communication with various other devices over a communication link, such as one or more networks 1038. For example, communication devices 1036 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The user device 1000 may further be equipped with various input/output (I/O) devices 1040. Such I/O devices 1040 may include a display, various user interface controls (e.g., buttons, joystick, keyboard, touch screen, etc.), audio speakers, connection ports and so forth. An interconnect 1024, which may include a system bus, point-to-point interfaces, a chipset, or other suitable connections and components, may be provided to enable communication between the processors 1002, the memory 1012, the storage 1018, the communication devices 1036, and the I/O devices 1040.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A hardware processor comprising:
   a first logic to process code stored in memory for an application that includes an extracted portion of code to be stored separately in secure memory; and
   a second logic to process in a secure execution hardware environment at least a portion of the extracted portion of code stored in the secure memory when the first logic reaches a location of the extracted portion of code, the secure memory restricted to access by the secure execution hardware environment, the secure execution hardware environment concealing content of the extracted portion of binary code while passing resultant data back to the first logic, wherein the extracted portion of code is to be decrypted by the second logic and executed in the secure execution environment and wherein the first logic to pass at least one parameter to the second logic to initiate a request to process the at least a portion of the extracted code.

2. The processor as recited in claim 1, wherein the first logic to redirect to the second logic upon detection of redirect code that is a placeholder in the application for the extracted portion of the code.

3. A method of securely distributing software, the method comprising:
   extracting portions of code as cutouts from an application to create a modified application that does not include the cutouts, wherein the modified application includes redirection code to a secure execution environment;
   encrypting the cutouts using an encryption key that is maintained by a user; and
   transmitting the encrypted cutouts and the modified application to the user, wherein the encrypted cutouts are to be decrypted by a second logic of the user and executed in the secure execution environment of the user and a first logic of the user to execute the modified application and pass a parameter to the second logic to initiate a request to process the encrypted cutouts.

4. A method of securely distributing software, the method comprising:
   extracting portions of code as cutouts from an application to create a modified application that does not include the cutouts, wherein the modified application includes redirection code to a secure execution environment;
   encrypting the cutouts using an encryption key that is maintained by a user; and
   transmitting the encrypted cutouts and the modified application to the user.

5. The method as recited in claim 4, wherein the cutouts are functions of code from the application.

6. The method as recited in claim 4, wherein the cutouts are limited in size to a threshold size.

7. The method as recited in claim 4, further comprising identifying the cutouts based at least in part using indicators from a developer.

8. The method as recited in claim 4, further comprising receiving the application in an unmodified state from a developer.

9. The method as recited in claim 4, further comprising transmitting the encryption key to the user prior to the encrypting.

10. One or more non-transitory computer-readable media maintaining computer-executable instructions to be executed on one or more processors to perform acts comprising:
   removing portions of code as cutouts from an application to create a modified application, wherein the modified application includes redirection code to a secure execution environment;
   encrypting the cutouts using an encryption key; and
   transmitting the modified application and the encrypted cutouts to the user, wherein the encrypted cutouts are to be decrypted by a second logic of the user and executed in the secure execution environment of the user and a first logic of the user to execute the modified application and pass a parameter to the second logic to initiate a request to process the encrypted cutouts.

11. The method as recited in claim 10, further comprising identifying the portions of code as the cutouts by an automated selection process.

12. The method as recited in claim 10, further comprising transmitting a user license to the user.

13. The method as recited in claim 10, wherein the modified application and the encrypted cutouts are included in an encrypted package for the transmitting.

14. The method as recited in claim 10, further comprising transmitting the encryption key to the user prior to the encrypting.

15. A system to securely store and execute an application, the system comprising:
   one or more processors;
   exposed memory to store an application executable by the one or more processors;
   secure memory to store code as one or more cutouts that are extracted from the application prior to receipt of the application by the exposed memory, the secure memory limited to access by a secure execution environment using the one or more processors, wherein the secure memory further includes an encryption key to decrypt the application and the one or more cutouts after a download of the application and the one or more cutouts;
   wherein the one or more processors to execute the application from the exposed memory and to pass at least one parameter to the secure execution environment prior to the executing the corresponding code; and
   when executing the application from the exposed memory reaches a cutout in the application, to execute corresponding code in the cutout in the secure execution environment without revealing contents of the cutout to the exposed memory.

16. The system as recited in claim 15, wherein the application includes redirect code in place of the cutouts to redirect the processing to the corresponding code in the cutout.

17. The system as recited in claim 15, wherein the cutout is a function of the application.

\* \* \* \* \*